US010085125B2

(12) United States Patent
Vendrow

(10) Patent No.: US 10,085,125 B2
(45) Date of Patent: Sep. 25, 2018

(54) MESSAGE MANAGEMENT METHODS AND SYSTEMS

(71) Applicant: RingCentral, Inc., San Mateo, CA (US)

(72) Inventor: Vlad Vendrow, Redwood City, CA (US)

(73) Assignee: RingCentral, Inc., Belmont, CA (US)

(*) Notice: Subject to any disclaimer, the term of this patent is extended or adjusted under 35 U.S.C. 154(b) by 195 days.

(21) Appl. No.: 14/556,049

(22) Filed: Nov. 28, 2014

(65) Prior Publication Data

US 2016/0156770 A1 Jun. 2, 2016

(51) Int. Cl.
*G06F 3/00* (2006.01)
*H04W 4/12* (2009.01)
*H04M 3/533* (2006.01)
*G06Q 10/10* (2012.01)
*H04M 1/725* (2006.01)

(52) U.S. Cl.
CPC ............ *H04W 4/12* (2013.01); *G06Q 10/107* (2013.01); *H04M 1/72552* (2013.01); *H04M 3/533* (2013.01); *H04M 1/72538* (2013.01)

(58) Field of Classification Search
None
See application file for complete search history.

(56) References Cited

U.S. PATENT DOCUMENTS

| | | |
|---|---|---|
| 6,640,230 B1 | 10/2003 | Alexander et al. |
| 7,330,721 B2 | 2/2008 | Bhatia et al. |
| 7,546,535 B2* | 6/2009 | Daniell ..................... 715/752 |
| 7,627,475 B2 | 12/2009 | Petrushin |
| 7,852,993 B2 | 12/2010 | Ju et al. |
| 8,594,284 B2 | 11/2013 | Wright et al. |
| 8,625,749 B2 | 1/2014 | Jain et al. |
| 8,638,911 B2 | 1/2014 | Balasaygun et al. |
| 8,769,090 B2 | 7/2014 | Tardelli et al. |
| 2012/0216127 A1* | 8/2012 | Meyr ........................ 715/752 |
| 2012/0303452 A1* | 11/2012 | Xue et al. ................. 705/14.49 |
| 2013/0159878 A1* | 6/2013 | Kim ...................... G06F 3/048 715/752 |
| 2014/0096032 A1* | 4/2014 | Mayblum et al. ............ 715/752 |
| 2014/0253666 A1* | 9/2014 | Ramachandran ....... H04W 4/12 348/14.06 |

* cited by examiner

*Primary Examiner* — Anil N Kumar
(74) *Attorney, Agent, or Firm* — Finnegan, Henderson, Farabow, Garrett & Dunner LLP

(57) ABSTRACT

A communications device is disclosed. The communications device comprises a memory configured to store instructions and a processor configured to execute the instructions to receive data representing a message provided by a caller, determine at least an attribute of the message based on the received data, generate one or more options based on the attribute of the message, and present the one or more options to the caller to prompt the caller to take an additional action related to the message.

20 Claims, 4 Drawing Sheets

MESSAGE MANAGEMENT METHODS AND SYSTEMS

TECHNICAL FIELD

The present disclosure relates to communication systems and, more particularly, methods and devices for managing messages based on attributes of the messages.

BACKGROUND

Messaging system is a useful business and personal tool that allows callers to optionally leave audio, video, or text messages when the called party is not responsive to an incoming call. Messaging systems have been implemented by telephone service providers, both wireline and wireless, as a common feature provided to their users. For example, if a communication device associated with a subscriber of the telephone service is unavailable, or if the subscriber does not respond to or accept a call received over the communication network, the call may be forwarded to a voicemail system. The voicemail system then records an audio message from the caller, stores the message in a mailbox associated with the subscriber's identifier (for example, phone number) for later retrieval by the subscriber, or forwards the stored message to the communication device associated with the subscriber when the device becomes available in the network.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
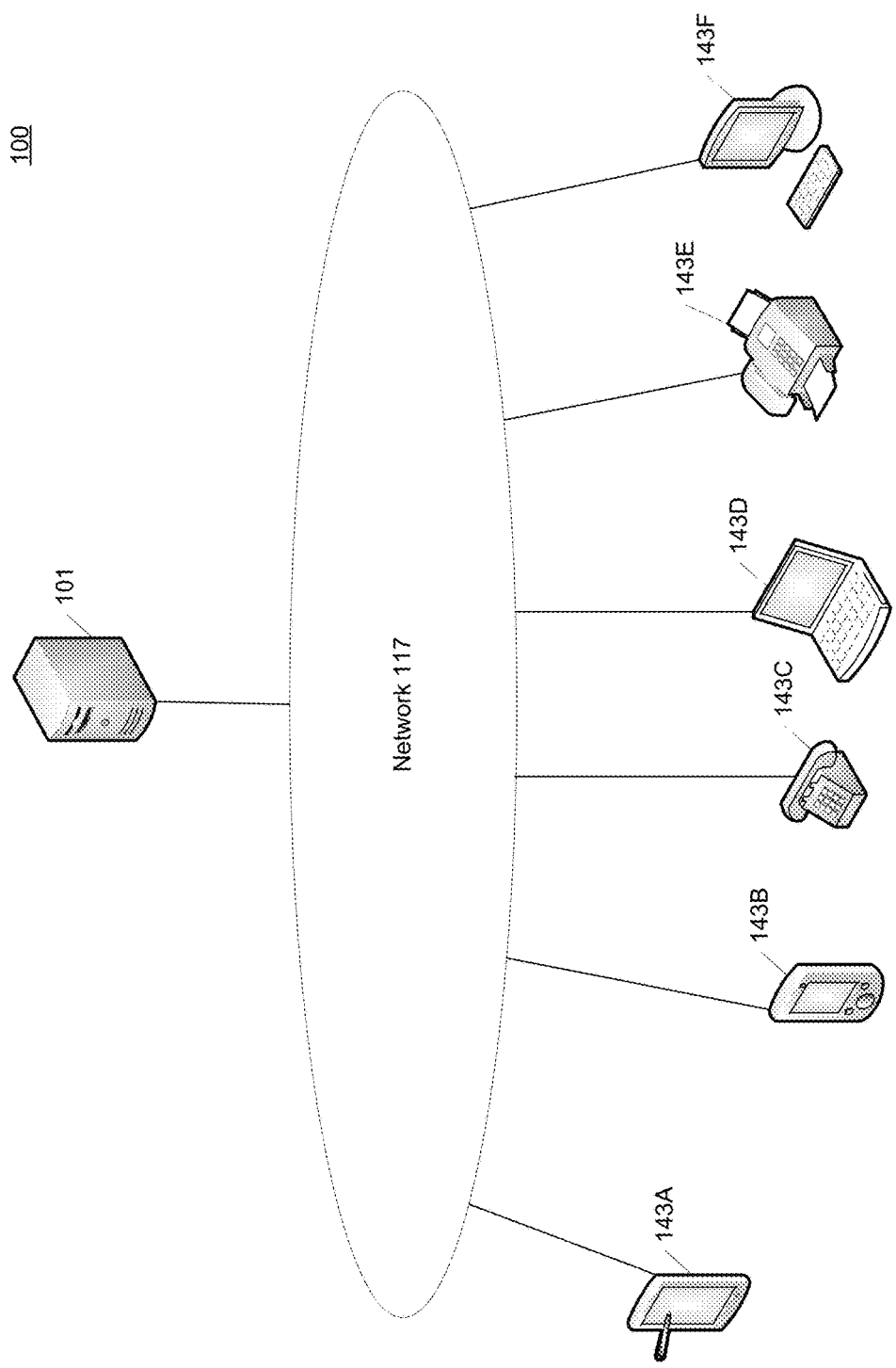
FIG. 1 is a simplified diagram of an example of a communications system in which various implementations described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

It is noted that the terms "user," "caller," and "callee," are being used in the interest of brevity and may refer to any of a variety of entities that may be, for example, a person, an organization, an organizational role within an organization, a group within an organization, etc. For example, a caller is a calling party in a voice dialing or video conferencing system, or a network subscriber sending a text message in a text messaging application. A callee is a called party in a voice dialing or video conference system, or a network subscriber receiving a text message in a text application.

Existing messaging systems, such as audio, video, or text messaging systems, merely passively record messages provided by subscribers without the ability to provide further assistance to the subscribers based on attributes of the messages, such as content or context of the messages. Example embodiments of the present disclosure seek to address the drawbacks of existing messaging systems by analyzing the attributes of the messages and providing options to callers based on the attributes of the messages. Example embodiments of the present disclosure provide operations or actions that a caller is enabled to perform based on the attributes of the message being placed or received from the caller, so as to improve message management and interactions between the caller and the communications system.

When the communication technique described herein is implemented on a caller's communications device, the disclosed technique does not require modification of other servers or devices within the network. The disclosed technique may be conveniently implemented by a caller's communications device through software upgrade or installation of an application as known in the art. As a result, example embodiments of the disclosed technique may provide a low cost and convenient implementation of message management.

In one disclosed embodiment, a communications device comprises a memory configured to store instructions and a processor configured to execute the instructions to receive data representing a message provided by a caller, determine at least an attribute of the message based on the received data, generate one or more options based on the attribute of the message, and present the one or more options to the caller to prompt the caller to take an additional action related to the message.

In another disclosed embodiment, a computer-readable medium comprises executable instructions, which, when executed by one or more processors, cause the one or more processors to receive data representing a message provided by the caller to the callee, determine at least an attribute of the message based on the received data, generate one or more options based on the attribute of the message; and present the one or more options to the caller to prompt the caller to take an additional action related to the message.

In another disclosed embodiment, a computer-implemented method comprises initiating a communication session between a caller and a callee, receiving data representing a message from the caller to the callee, determining at least an attribute of the message based on the received data, generating one or more options based on the attribute of the message, and presenting the one or more options to the caller to prompt the caller to take an additional action related to the message.

Embodiments of the present disclosure provide methods, devices, articles of manufacture, and systems for message management based on attributes of messages, such as content or context of the messages. The messages that may be implemented in the disclosed message management for messaging systems include, for example, audio, video, and text messages. In some embodiments, a first a caller may use a communications device, such as a cell phone or other communications device, to place an audio or video call for example to a communications device associated with a callee. If the call is not answered (for example, when the callee is unable to answer the call or chooses not to answer, a communications server is down, or the callee's communications device is unavailable to the network for another reason), the disclosed messaging system prompts the caller to provide a message (for example, an audio, video, or text message) for the callee. If the caller proceeds to provide the message, the messaging system analyzes the attributes of the message, such as content or context of the message, either contemporaneously as the message is being received or upon receipt, and provides options to the caller based on the attributes of the message.

In some embodiments, the analysis of attributes of the message is performed by the messaging system (such as a message server or a caller's communications device) while the message is received from the caller. In other embodiments, additional information, such as a current location of the callee, a relationship between the caller and the callee, prior correspondence between the caller and the callee, etc., is retrieved by the caller's communications device to provide further context to the message.

The embodiments herein include computer-implemented methods, tangible non-transitory computer-readable mediums, and communications devices. The computer-implemented methods can be executed, for example, by at least one processor that receives instructions from a non-transitory computer-readable storage medium. Similarly, messaging systems and communications devices consistent with the present disclosure can include at least one processor and memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," can additionally refer to multiple structures, such a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps or stages consistent with an embodiment herein. Additionally, one or more computer-readable storage mediums can be utilized in implementing a computer-implemented method. The term "computer-readable storage medium" should be understood to include tangible items and exclude carrier waves and transient signals.

FIG. 1 shows an example of a communications system 100 in which various implementations of message management as described herein is practiced. System 100 can be, for example, a telephony system such as a hosted Private Branch Exchange (PBX) platform that provides voice and/or video over IP, fax services, etc. Communications system 100 includes a server 101, which includes network computing resources (for example, servers, routers, switches, network connections, storage devices, etc.) necessary to support the services provided by communications system 100. In the presently described example embodiment, server 101 is a message server for providing message services, such as a voicemail message server.

FIG. 1 further shows that communications system 100 includes various additional components or devices. Specifically, FIG. 1 shows that server 101 is in communication with various communications devices 143A-143F through a network 117. Communications devices 143A-143F represent a diversity of client communications devices that connect with a services system designed in accordance with one or more implementations as described herein. Such client communications devices include, for example (and without limitation), cell phones, smart phones, tablets, laptop and desktop computers, conventional telephones, voice over Internet Protocol (VoIP) phones, teleconferencing devices, videoconferencing devices, set top boxes, gaming consoles, etc. Reference to specific client communications device types should therefore not be construed to limit the scope of the present disclosure.

Server 101 provides message services to corresponding subsets of users or subscribers. Server 101 also provides other services including, for example, user account management and configuration, billing services, accounting services, etc. Server 101 includes an account database to support the communication among communications devices 143A-143F, storing configuration details and other information regarding each user's account.

In some example embodiments, communications devices 143A-143F can receive messages, such as audio messages, video messages, or text messages, from users and transmit the messages to server 101 for storage or processing. In some embodiments, communications devices 143A-143F receives messages, such as audio messages, video messages, or text messages, from server 101 or access stored messages at server 101. In some embodiments, communications devices 143A-143F receive notification of new messages from server 101 and then access the stored messages at server 101. In some embodiments, communications devices 143A-143F are configured to generate and provide notifications of messages to the users upon receipt of new messages.

Figure 2:
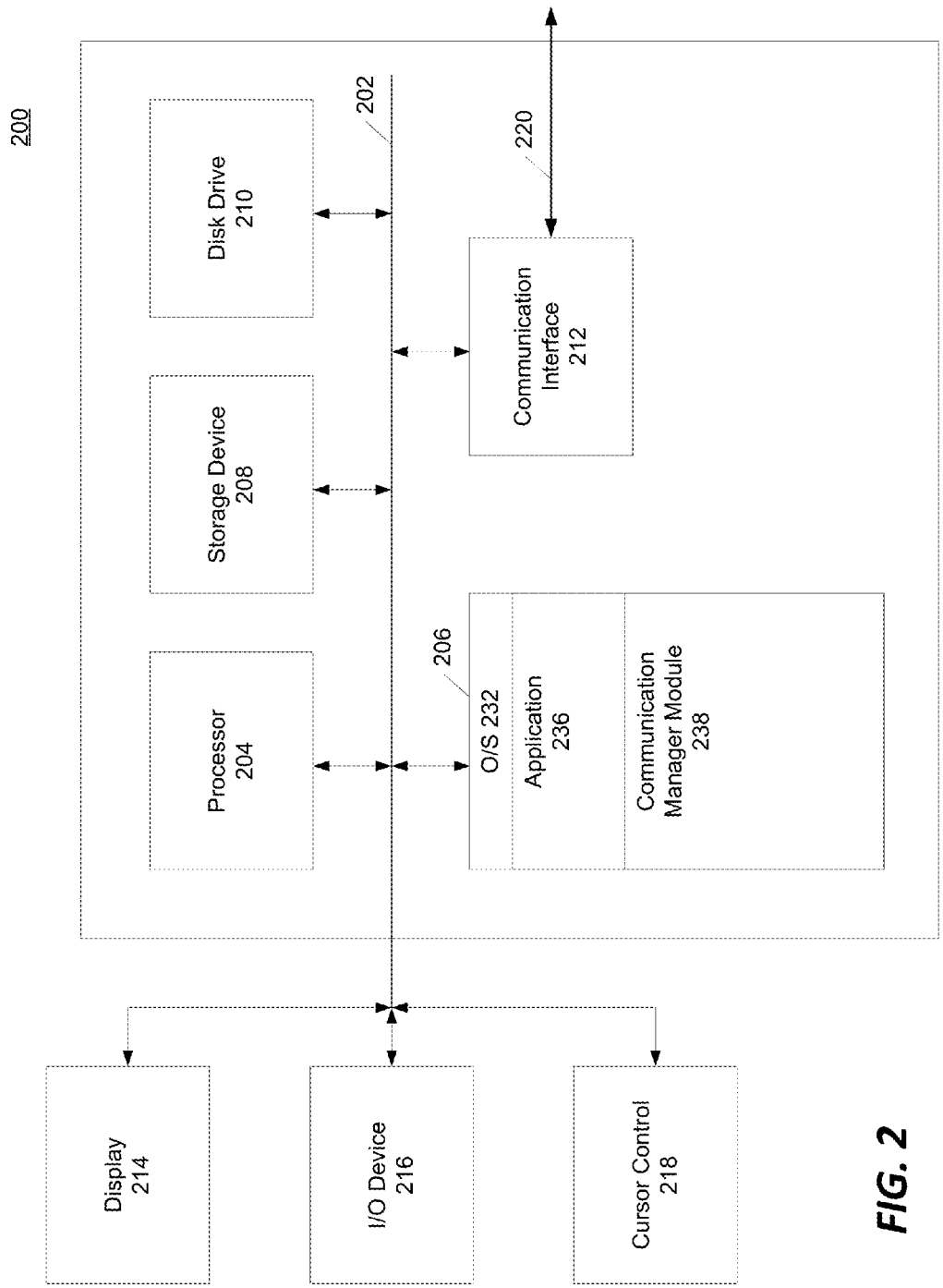
FIG. 2 illustrates an example device for implementing embodiments consistent with the present disclosure.

FIG. 2 illustrates an example communications device for implementing embodiments consistent with the present disclosure. In some examples, communications device 200 can be used to implement computer programs, applications, methods, processes, or other software to perform embodiments described in the present disclosure, such as server 101 or communications devices 143A-143F provided in FIG. 1. Communications device 200 includes a bus 202 or other communication mechanism for communicating information, which interconnects subsystems and devices. As shown in FIG. 2, communications device 200 includes one or more processors 204, system memory ("memory") 206, storage device 208 (for example, ROM), disk drive 210 (for example, magnetic or optical), communication interface 212 (for example, a modem, Ethernet card, or any other interface configured to exchange data with a communications network), display 214 (for example, CRT or LCD), input/output device 216 (for example, keyboard or touch screen), cursor control 218 (for example, mouse or trackball).

According to some examples, communications device 200 performs specific operations in which processor 204 executes one or more sequences of one or more instructions stored in system memory 206. Such instructions can be read into system memory 206 from another computer readable medium, such as static storage device 208 such as a disk drive. In some examples, hard-wired circuitry is used in place of or in combination with software instructions for implementation. In the example shown, system memory 206 includes modules of executable instructions for implementing an operation system ("O/S") 232, an application 236, and a communication manager module 238, which can provide the functionalities disclosed herein.

Communications device 200 transmits and receives message in the form of data, and instructions, including program code (i.e., application code) through communication link 220 and communication interface 212. Received program code is executed by processor 204, and stored in disk drive 210, or other non-volatile storage for later execution. Communications device 200 may also provide audio communication through communication link 220, so that communications device 200 may initiate an audio communication session with another communications device in the network.

Communications device 200 also stores contact information. The contact information is stored in disk drive 210 or storage device 208. The contact information includes a plurality of profiles associated with persons or entities that the user specifies. In each profile, communications device 200 stores the name of the person or entity associated with the profile and one or more of contact numbers, email addresses, and web addresses associated with the person or entity. Communications device 200 presents the contact information to the user by way of a contact list displayed on display 214. According to additional embodiments, communications device 200 receives the contact information from other sources, such as other devices in communication with network 117 or a contact database. For example, communications device 200 receives the contact information from a social network account (for example, Facebook® or LinkedIn®) of the caller or a web email account (for example, Gmail) of the caller. Communications device 200 then compiles a combined contact list based on the contact information from different sources. In some alternate embodiments, the contact information is stored in a server communicatively coupled to communications device 200, such as server 101 described in connection with FIG. 1. In some embodiments, communications device 200 receives messages input by a caller. For example, communications device 200 receives a message provided by a caller through an input device, such as a microphone, a camera, a keyboard, a touchscreen, etc. The message may be provided by the caller when, for example, a call from communications device 200 is being placed to a communications device associated with a callee, is not answered.

In some embodiments, when the call is not answered, communications device 200 (for example, server 101 or the caller's communications device) generates a voice or visual prompt through device 200 to prompt the caller to provide a message. The determination that the call is not answered and the generation of the prompt may be performed by server 101, the caller's communications device (i.e., communications device 200), the callee's communications device, or other components of the messaging system.

In response to the prompt, the caller then indicates that he/she is willing to provide a message. The caller provides the message through a microphone, a camera, a keyboard, a touchscreen, or other input devices associated with the caller's communications device. Communications device 200 (i.e., server 101 or the caller's communications device) then proceeds to receive the message as the caller provides the message. In some embodiments, communications device 200 may store data representing the message into storage device 208 or disk drive 210 and retrieve the data for later processing.

Furthermore, communications device 200 processes the data representing the message as the message is being received, or after receipt of the message. For example, processor 204 uses linguistic analysis techniques to analyze and determine attributes of the message. The linguistic analysis techniques may be those known in the art, such as semantic-based voice or text recognition, vector space analysis, rule-based analysis, statistical analysis, or other known techniques. In some embodiment, the attributes of the message includes, for example, content of the message. Processor 204 may identify individual words, phrases, and sentences in the message and determine a meaning of the message based on the message content. Based on the meaning derived from the message content, processor 204 then applies additional operations, such as providing additional options to the caller to manage the message.

For example, when the caller placing a message (such as a voicemail, a video message or a text message) states "I will try to reach you at your work number" as part of the message, upon completion of the recording of the sentence, communications device 200 can present the caller with a selectable option, "Would you like to call the work number of the callee?" Communications device 200 presents the selectable option by way of texts or graphics on a graphical user interface (GUI) feature shown on display 214. Alternatively, communications device 200 presents the selectable option by way of a voice, text, or visual prompt. In some embodiments, server 101 generates the option and presents the option to the caller through communications device 200.

As another example, processor 204 can detect that the message being recorded is related to an appointment request by the caller to the callee. In this embodiment, once the recording is completed, communications device 200 provides the caller with an option to send a calendar event to the callee's email account or callee's communications device. Alternatively, processor 204 detects that the message being placed is related to an existing appointment between the caller and the callee. In this embodiment, communications device 200 provides the caller with an option to send a reminder to the callee's email account or allow the caller to modify the appointment with the callee.

According to some embodiments, the attributes of the message include context related to the message. Processor 204 analyzes and determines the context related to the message and applies the additional operations to the message based on the context. In an embodiment, processor 204 identifies the caller and the callee based on, for example, their individual phone numbers, and retrieve prior correspondences between the caller and the callee accordingly. The prior correspondences may include emails, audio messages, video messages, text messages, appointment entries, calendar events, etc. Processor 204 retrieves the prior correspondences from a server in communication with network 117, internal storage devices of communications device 200, or other communications devices in communication with network 117. Processor 204 identifies prior correspondences that are related to the message based on the content of the message. Based on the related prior correspondences between the caller and the callee, processor 204 determines an urgency level for the message being recorded by the caller. Processor 204 then marks the message according to the urgency level before transmitting the message to server 101. For example, processor 204 assigns one of a plurality of urgency levels (for example, high, medium, and low) to the message and generates an indicator representing the assigned urgency level for the message. When transmitting the message to the communications device of the callee, processor 204 attaches the indicator to the message so that the communications device of the callee may determine the urgency level for the message according to the indicator.

In some alternate embodiments, processor 204 analyzes the context of the message based on other information related to the caller and the callee. For example, processor 204 determines the message is related to an existing appointment between the caller and the callee at a particular location and determines existing location information of the caller, prior email correspondence between the caller and the callee, previous text message exchanged between the caller and the callee, etc. Processor 204 then generates visual or voice prompts to ask the caller whether he/she would like to view navigation information from the caller's existing location to the location of the appointment.

Figure 3:
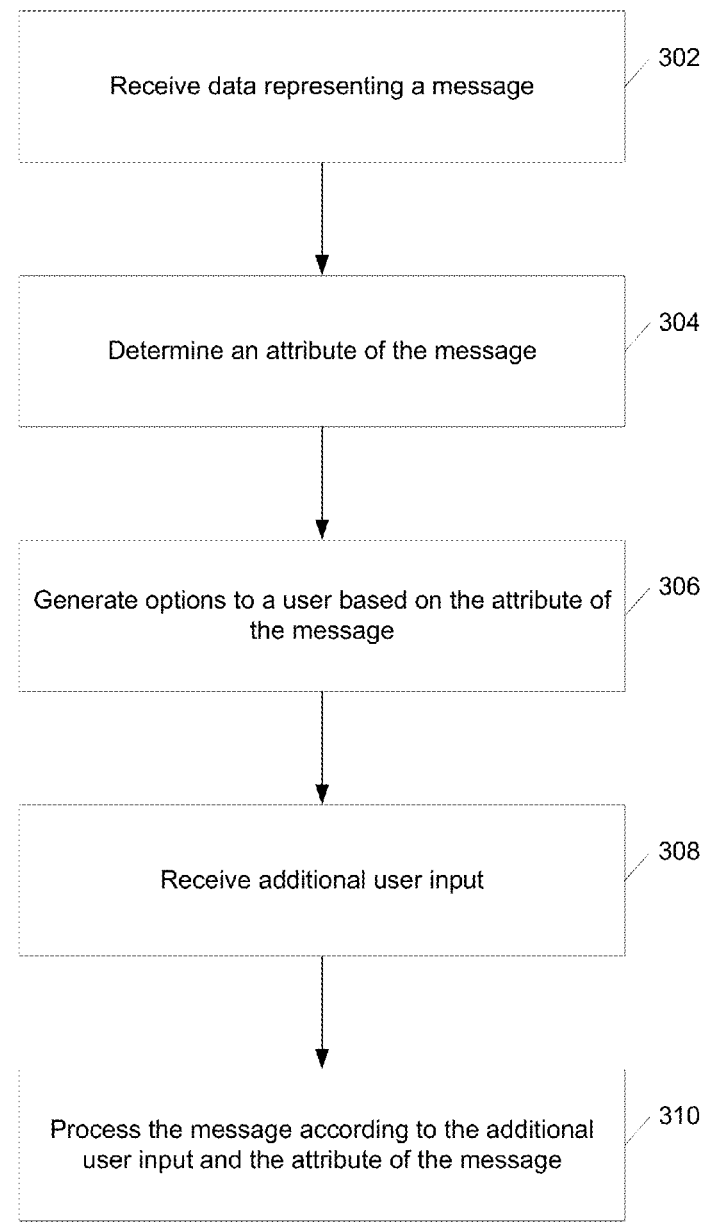
FIG. 3 illustrates an example process for providing message management in a messaging system, in accordance with embodiments of the present disclosure.

FIG. 3 depicts an example process 300 for providing message management based on attributes of the message, in accordance with some embodiments of the present disclosure. The steps associated with this example process can be performed by the components of FIG. 1 and FIG. 2, communications device 200, which may be server 101 or communications devices 143A-143F. In the following description, reference is made to certain components of FIG. 1 and FIG. 2 for purposes of illustration. It will be appreciated, however, that other implementations are possible and that components other than that illustrated in FIG. 1 and FIG. 2 can be utilized to implement the example method.

At step 302, communications device 200 shown in FIG. 2 receives data representing a message provided by a caller. In some embodiments, communications device 200 is server 101 that receives the data representing the message through, for example, one of communications devices 143A-143F associated with the caller. The caller provides the message through a microphone, a camera, a physical or virtual keyboard, or a touch screen associated with the caller's communications device, which converts the message to data suitable for processing by computers. The caller's communications device then transmits the data representing the message to sever 101 (i.e., communications device 200). Alternatively, communications device 200 may be a terminal device, such as communications devices 143A-143F. Accordingly, communications device 200 receives the message from the caller through a microphone, a camera, a physical or virtual keyboard, or a touch screen associated therewith, and converts the message to data suitable for processing.

The received message may be an audio message (such as a voicemail), a video message, an email, a text message, a fax, a picture, a multimedia data file, and/or any other types of messages that convey information. In some embodiments, the received message is included in a digital message file, such as an audio or video file, that may be presented to the caller using an appropriate application. The digital message file may have associated metadata describing the message file, such as a dimension of the message (for example, time length of the message, number of pages of the message), identifier for the sending communications device (for example, sender name and/or phone number), a user identifier for the intended recipient (for example, user name and/or phone number), the message type, the date and time the message was received, etc.

At step 304, communications device 200 determines at least an attribute of the message based on the data received at step 302. The attribute of the message includes, for example, content or context of the message. For example, based on the data received, the communications device recognizes individual words, phrase, and sentences in the message, based on voice recognition techniques or optical character recognition techniques. The communications device then determines the content of the message by applying natural language processing techniques to the recognized words, phrases, and sentences. The communications device derives meaning from the words, phrases, and sentences. For example, the communications device identifies names, numbers, addresses, events, locations, etc., specified in the message. The communications device also determines an operation that the caller intends to perform or is willing to perform based on the words, phrases, and sentences.

Alternatively or additionally, communications device 200 determines the context of the message based on the content of the message, additional data stored in the communications device or retrieved from other communications devices within the network, or a combination thereof. The context of the message includes, for example, a location of the caller, a location of the callee, a time of reception of the message by the communications device, a prior correspondence between the caller and the callee related to the message, a relationship between the caller and the callee, etc. The prior correspondence includes, for example, a prior email correspondence, a prior text message correspondence, a prior audio/video correspondence, a prior facsimile correspondence, a prior telephone correspondence, etc.

For example, communications device 200 determines a location of the caller or a time of reception of the message when the message is being received from the caller. The communications device determines the location of the caller based on, for example, a GPS signal or a triangulation technique known in the art. As another example, the communications device determines the time of reception of the message based on an internal clock or a network clock. The time of the message may be a time of reception of the message by the communications device. The communications device may also determine a location of the callee based on data retrieved from the callee's communications device or a server in communication with the network.

Communications device 200 determines the prior correspondence based on a combination of the content of the message and data stored within the communications device or retrieved from other communications devices. In some embodiments, the device searches within its internal memory for prior correspondences between the caller and the callee related to the content of the message. In some embodiments, based on the content of the message, communications device 200 requests from other communications devices or servers for data representing prior correspondences that are related to the content of the message.

For example, communications device 200 determines a person's name specified in the message, and search for prior correspondences between the caller and the person or prior correspondences related to the person. As another example, the communications device determines a location, an event, or a time specified in the message, and searches for prior correspondences related to the location, the event, or the time. If the message includes information related to an appointment between the caller and the callee, the communications device may search for prior correspondences related to the appointment.

Alternatively, communications device 200 determines the urgency of the message based on the content or context of the message and marks the message accordingly. For example, if the message's content specifies that it is urgent, the communications device marks the message with an indicator indicating that the message is urgent. As another example, the communications device may determine the urgency of the message based on prior correspondences between the caller and callee that are related to the message. Communications device 200 identifies the related prior correspondences, such as an email, an audio message, a text message, etc., based on the content of the message. If the related prior correspondences indicate urgency, the communications device may deem the message as urgent and mark the message accordingly. Alternatively, communications device 200 determines an urgency level for the message and generates an indicator for the message representing the urgency level, as discussed above.

At step 306, communications device 200 applies additional operation to the message by, for example, presenting options to the caller to manage the message based on the content or context of the message. In some embodiment, communications device 200 generates voice prompts or visual representations, through an output device, representing the options. The output device may be, a speaker, a display, or a touchscreen associated with the caller's communications device, such as communications devices 143A-143F. In alternative embodiments, communications device 200 is the terminal device associated with the caller and generates the options through display 214 or other output devices thereof.

The options prompt the caller to take further steps or provide additional instructions or inputs to process the message. For example, if the received message from a caller says "I will try to reach you at your work number," upon determining the content of the message, the communications device generates a text prompt on the display, such as "Would you like to call the work number?" Still alternatively, the options include a plurality of choices for the caller to choose from. For example, the communications device generates text prompts including: "Press or say '1' to call the work number of the callee," "Press or say '2' to email the callee," "Press or say '3' to mark the message as urgent." Still alternatively, the communications device presents the options by way of a voice prompt through a speaker. For example, the voice prompt may be "If you would like to call the work number, press or say '1.'"

As another example, if the received message says "I will meet you at the Irish Bar in 30 minutes," upon determining the content of the message, the communications device generates a text, graphic, or voice prompt to the caller, such as "Would you like to start the navigation to the Irish Bar?" As another example, if the received message says "I am calling about the email I sent you yesterday," upon determining the content of the message, the communications device searches in the communications device or an email server for the email referred to in the message. The communications device then determines whether the related email is urgent and marks the message accordingly. Alternatively, the communications device determines an urgency level of the related email and marks the message in accordance with the urgency level of the related email. Alternatively, the communications device also determines a calendar entry in the communications device or a server that is related to the message based on the content of the message. The communications device then presents the calendar entry or a reminder corresponding to the calendar entry to the caller.

At step 506, communications device 200 receives additional user input indicative of a response to the presented options or prompts. For example, the communications device receives the additional user input through a keyboard or a touch screen when the caller makes a selection from the options. Alternatively, the communications device receives the additional user input through a microphone when the caller provides a voice input through the microphone.

At step 508, communications device 200 may analyze the additional user input to determine the option that the caller chooses and process the message according to the additional user input and the content or context of the message. At this step, the communications device first sends the message to the callee's communications device or a message server before further processing the message. If the communications device determines the message is urgent as described above, the message is sent with an indicator that indicates the urgency. Alternatively, if the message is assigned an urgency level, the message is sent with an indicator indicative of the assigned urgency level.

According to some embodiments, in response to a prompt, such as "Would you like to call the work number of the callee?" the caller provides an additional user input as described above. Based on the additional user input, the communications device determines that the caller is willing to call the work number of the callee. Accordingly, the communications device sends the message (for example, the original message provided by the caller) to the callee and then initiates a call to the work number associated with the callee. The communications device determines the work number associated with the callee by searching in the contact information stored in its internal memory or in data stored on other communications devices in communication with the network. Alternatively, the communications device holds the message temporarily and initiates a call to the work number of the callee. If the call to the work number of the callee is not successful or if the callee does not answer the call at the work number, the communications device then sends the message to the callee. If, however, the call to the callee's work number is successful, the communications device holds the message until the caller specifically requests the message to be sent or simply discard the message.

As another example, if communications device 200 generates a plurality of options to the caller, the additional user input indicates that the caller selects one of the options to proceed. The communications device sends the message to the callee and then initiates additional operation according to the user-selected option. For example, when the communications device generates text prompts including: "Press or say '1' to call the work number of the callee;" "Press or say '2' to email the callee," "Press or say '3' to mark the message as urgent," and the caller selects "2," the communications device proceeds to send the message to the callee's number initially called by the caller and also emails a copy of the message to the callee's email address. The communications device determines the callee's email address by searching in the contact information stored in its internal memory or data stored in other communications devices in communication with the network.

Figure 4:
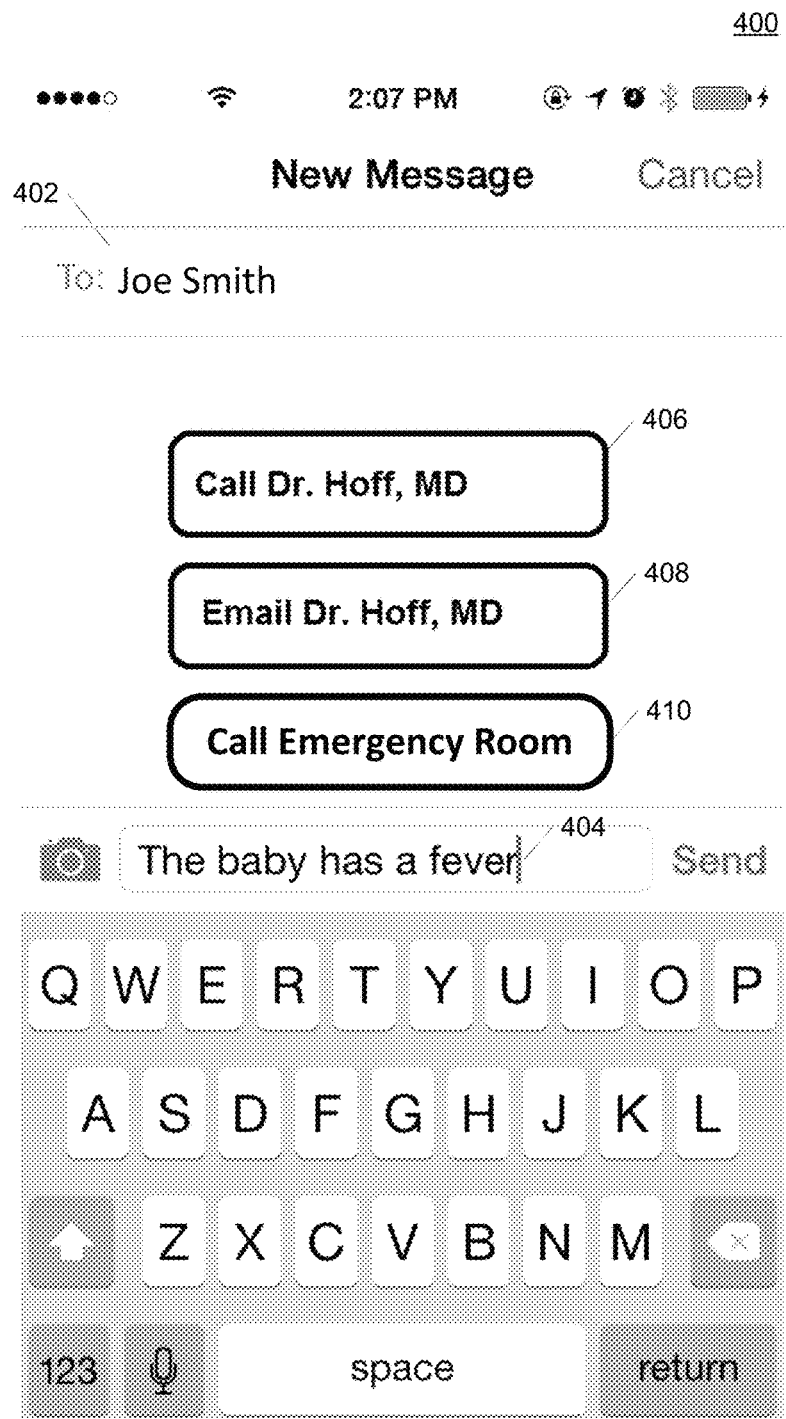
FIG. 4 illustrates an example GUI feature for massage management in a messaging system, in accordance with embodiments of the present disclosure.

FIG. 4 depicts an embodiment of a GUI feature 400 selectable by the caller, implemented in communications system 100 of FIG. 1, for managing text messages based on attributes of messages. User interface 400 may be generated by server 101 for display at a caller's communications device, such as communications devices 143A-143F in FIG. 1. The caller's communications device presents GUI feature 400 through its display device and interacts with the caller through GUI feature 400 according to the embodiments disclosed herein. Alternatively, GUI feature 400 is generated by any one of communications devices 143A-143F, which interacts with the caller as described herein.

GUI feature 400 includes a destination field 402 for the caller (i.e., the sender of a text message) to specify a destination of the text message. The destination of a text message may be a telephone number, an IP address, an email address, or other identifications that identify an intended callee of the text message (i.e., the receiver of the text message). Additionally, when the caller chooses to input an identifier of the callee, such as a name of the callee, server 101 may search in its database to retrieve a telephone number, an email address, or other contact information that is associated with the specified identifier.

GUI feature 400 also includes a text field 404 for the caller to input or edit the body of the text message. GUI feature 400 may receive user input for the body of the text message through a keyboard, a touch screen, a microphone, or other input devices or modules.

For example, as shown in FIG. 4, the caller here specifies "Joe Smith" in destination field 402 as the intended callee of the message. The caller also enters "The baby has a fever" in text field 404 as the body of the message. When the caller activates the "Send" button, the messaging system transmits data representing the message from the caller's communications device to server 101, which then routes the data to the destination of the message (e.g., a communications device associated with the callee, Joe Smith). In this example, Joe Smith may be a person related to the caller, such as the caller's spouse, friend, or other relative or acquaintance. The caller intends to inform Joe Smith about the status of the baby.

Additionally, upon receiving the message from the caller, the server 101 analyzes the text message and determines attributes of the text message. For example, server 101 uses linguistic analysis techniques to determine content of the text message. Server 101 then derives a meaning from the content of the text message and determines that the caller intends to inform the callee (i.e., Joe Smith) about the health issue of a child. Based on the content of the text message, the messaging system generates options 406-410 that prompt the caller to take further actions and presents the options to the caller through GUI feature 400. For example, options 406-410 may include a button 406 that prompts the caller to initiate a voice/video call to the callee or a third person different from the callee (i.e., Dr. Hoff, MD), a button 408 that prompts the caller to send an email to the callee or a third person different from the callee, or a button 410 that prompts the callee to call for an emergency service.

Based on the content or context of the text message, server 101 identifies or selects, from the caller's contact list, the third person that is appropriate for the content or context. For example, as shown in FIG. 4, upon determining that the content of the text message is related to a child's health issue, server 101 selects a medical profession, such as a doctor (i.e., Dr. Hoff, MD) or a nurse, from the caller's contact list. Server 101 identifies the third person by matching his/her profession with the content or contact of the text message. Sever 101 determines the professional of the third person based on information stored in server 101, communications devices 143A-143F, or other information sources. Alternatively, server 101 selects the third person based on a prior designation by the caller. The prior designation specifies the call's preferred contact for particular content or context.

In some embodiments, the messaging system further determines context of the message and generates options 406-410 based, additionally, on the context of the message. For example, in FIG. 4, the messaging system determines a current time when the message "The baby has a fever" is received from the caller and generates the options based on the current time. If the current time is within regular business hours, the messaging system may omit some options, such as button 410 that prompts a voice/video call to the emergency service. As a result, the caller is only prompted to contact Dr. Hoff in this case. If, however, the current time is outside of regular business hours, the messaging system may generate the options to prompt the caller to contact Dr. Hoff as well as the emergency service. The context of the message that the messaging system uses to generate the options also includes other information as discussed above in connection with FIGS. 1-3. For example, the context of the message includes a prior correspondence between the caller and the callee, a location of the caller, a location of the callee, an appointment related to the caller or the callee, a calendar entry related to the caller or the callee, or an event related to the message.

In some embodiments, when the message received from the caller includes a video message, the attributes of the video message may be derived from the audio information as well as the video information of the message. The messaging system analyzes the audio information as well as the video information of the message to determine the content and context of the message. For the audio information, the messaging system applies the linguistic analysis techniques discussed above and derives the content and context of the message therefrom. For the video information, the messaging system applies image analysis techniques known in the art, such as image filtering, computer vision, pattern recognition, etc. For example, based on the analysis of the video information, the messaging system may identify a face of the person in the video, a motion of the person in the video, a background of the video, etc. The messaging system then generates the options to the caller based on the audio information as well as the video information of the message.

For example, the messaging system may identify the identity of the person in the video based on the face of the person in the video and compare the identity of the person in the video with the identity of the caller. Based on the comparison, the messaging system determines whether the person in the video is the caller and enforces security measures accordingly. For example, if the messaging system determines that the identity of the person in the video is different from the identity of the caller, the messaging system holds the message or requests the caller to provide additional information to validate or confirm his/her identity.

As another example, the messaging system may determine that the caller is exercising or driving based on the motion of the caller or the background of the video message. As a result, the messaging system generates options to prompt the caller to initiate a voice call to the callee or a third person, rather than sending an email.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, advantageous results still could be achieved if steps of the disclosed techniques were performed in a different order or if components in the disclosed systems were combined in a different manner or replaced or supplemented by other components. Although embodiments of the disclosure are illustrated using server 101, the message management functions described herein may also be implemented on individual communications devices 143A-143F or communications device 200 without departure from the principle of the disclosure. Other implementations are also within the scope of the following example claims.

Therefore, it is intended that the disclosed embodiments and examples be considered as examples only, with a true scope of the present disclosure being indicated by the following claims and their equivalents.

What is claimed is:

1. A communications device, comprising:
a memory configured to store instructions; and
at least one processor configured to execute the instructions to:
determine, from content of an outgoing message, at least an attribute;
generate one or more options based on the attribute of the message;
present to a caller associated with the message the one or more options, thereby prompting the caller to take an additional action related to the message; and
transmit the message to a callee.

2. The communications device of claim 1, wherein the communications device is a server and the at least one processor is further configured to:
receive data representing the message from a user device associated with the caller; and
store the data representing the message for determining the attribute.

3. The communications device of claim 1, wherein the at least one processor is further configured to:
receive a user input indicating a selection of one of the one or more options; and
apply an operation based on the user input.

4. The communications device of claim 1, wherein the message includes at least one of an audio message and a video message.

5. The communications device of claim 4, wherein the at least one processor is configured to determine the attribute of the message based on natural language processing.

6. The communications device of claim 1, wherein the content of the message includes a linguistic element.

7. The communications device of claim 6, wherein the at least one processor is further configured to determine the linguistic element using voice recognition.

8. The communications device of claim 3, wherein the operation is associated with the callee, and the at least one processor is configured to apply the operation based on a context of the message.

9. The communications device of claim 1, wherein the at least one processor is configured to present to the caller the one or more options when the callee does not answer to the message.

10. The communications device of claim 1, wherein the attribute of the message includes context of the message, and the at least one processor is further configured to determine a context of the message based on the content of the message.

11. The communications device of claim 10, wherein the context of the message includes at least one of a prior correspondence between the user and a person related to the message, a location of the user, a location of the person related to the message, a time of reception of the message by the communications device, or an event related to the message.

12. The communications device of claim 1, wherein the at least one processor is further configured to:
determine a telephone number based on the attribute of the message; and
initiate a communication session to a communications device associated with the telephone number.

13. The communications device of claim 10, wherein the at least one processor is configured to:
determine an urgency level for the at least one message based on at least one of the content or the context of the message;
generate an indicator indicative of the urgency level;
associate the indicator with the message; and
transmit the message with the associated indicator.

14. The communications device of claim 1, wherein the communications device is a server associated with the caller.

15. The communications device of claim 1, wherein the communications device is a terminal device associated with the caller.

16. A computer-readable medium comprising executable instructions, which, when executed by one or more processors, cause the one or more processors to:
determine, from content of an outgoing message to be transmitted, at least an attribute;
generate one or more options based on the attribute of the message;
present to a caller associated with the message the one or more options, thereby prompting the caller to take an additional action related to the message; and
transmit the message to a callee.

17. The computer-readable medium of claim 16, wherein the instructions further cause the one or more processors to:
receive a user input indicating a selection of one of the one or more options; and
apply an operation based on the user input.

18. The computer-readable medium of claim 16, wherein the instructions are executed on a server and further cause the one or more processors to:
receive data representing the message from a user device associated with the caller; and
store the data representing the message for determining the attribute.

19. The computer-readable medium of claim 18, wherein the context of the message includes at least one of a prior correspondence between the user and a person related to the message, a location of the user, a location of the person related to the message, a time of reception of the message by the communications device, or an event related to the message.

20. A computer-implemented method, comprising:
determining, from content of an outgoing message, at least an attribute;
generating one or more options based on the attribute of the message;
presenting to a caller associated with the message the one or more options, thereby prompting the caller to take an additional action related to the message; and
transmitting the message to a callee.

* * * * *